(12) United States Patent
Hollis et al.

(10) Patent No.: US 10,018,208 B2
(45) Date of Patent: Jul. 10, 2018

(54) APPARATUS AND METHOD FOR SECURING PLANKS

(71) Applicant: CKH, Inc., Springfield, OR (US)

(72) Inventors: Cameron Hollis, Springfield, OR (US); Tab Gay, Springfield, OR (US); Terrell Gay, Springfield, OR (US)

(73) Assignee: CKH, Inc., Springfield, OR (US)

( * ) Notice: Subject to any disclaimer, the term of this patent is extended or adjusted under 35 U.S.C. 154(b) by 67 days.

(21) Appl. No.: 15/080,667

(22) Filed: Mar. 25, 2016

(65) Prior Publication Data

US 2016/0340918 A1    Nov. 24, 2016

Related U.S. Application Data

(60) Provisional application No. 62/163,428, filed on May 19, 2015.

(51) Int. Cl.
*E04G 5/08* (2006.01)
*E04G 7/00* (2006.01)
(Continued)

(52) U.S. Cl.
CPC ............... *F16B 2/065* (2013.01); *E04G 5/14* (2013.01); *E04G 7/28* (2013.01); *F16B 2/12* (2013.01)

(58) Field of Classification Search
CPC .......... E04G 5/067; E04G 5/08; E04G 5/066; E04G 5/061; E04G 5/064; E04G 5/04; E04G 5/00; E04G 5/004; E04G 13/04; E04G 7/28; E04G 2007/285; E04G 7/06; E04G 7/08; E04G 7/10; E04G 7/24; B25B 5/109; B25B 5/10
(Continued)

(56) References Cited

U.S. PATENT DOCUMENTS 2,332,477 A * 10/1943 Thornley ............... E04G 5/062
                                                              182/87
2,568,233 A *  9/1951 Hamilton ............... B25B 5/003
                                                              248/228.1
(Continued)

FOREIGN PATENT DOCUMENTS

WO    WO 8002305    * 10/1996    ............... E04G 5/04

*Primary Examiner* — Daniel P Cahn
(74) *Attorney, Agent, or Firm* — Hancock Hughey LLP

(57) ABSTRACT

The invention comprises a clamp that is easily and quickly attached to planks such as those in a scaffold platform that is defined by plural planks laid side-by-side to define a platform in a scaffold structure. The clamp resides beneath the planks and is therefore not a trip-hazard for workers, and the clamp is readily adjustable to compress the planks to one another to stabilize the platform. The invention creates a stronger and more stable platform by eliminating the vertical deflection of each individual plank as well as any other relative movement. The inventive clamp features adjustable telescopic tubing which allows for the user to adjust the clamp to be utilized on a number of different scaffolding frame widths. Fine adjustments to the width of the clamp are made available through a threaded clamping nut that can only be adjusted using a $7/8^{th}$ inch socket, which is a size typically carried by a scaffolding worker. A guard post apparatus may be attached to the clamps to allow for a safety railing.

17 Claims, 3 Drawing Sheets

(51) Int. Cl.
*F16B 2/06* (2006.01)
*E04G 5/14* (2006.01)
*E04G 7/28* (2006.01)
*F16B 2/12* (2006.01)

(58) Field of Classification Search
USPC ........................................................ 248/241
See application file for complete search history.

(56) References Cited

U.S. PATENT DOCUMENTS

| | | | | |
|---|---|---|---|---|
| 3,002,726 A * | 10/1961 | Ford | ...................... | E04H 17/266 254/231 |
| 3,220,691 A * | 11/1965 | Dudley | ................... | E04G 13/04 248/228.2 |
| 3,595,510 A * | 7/1971 | Hutchinson | ............... | E04G 5/06 182/113 |
| 4,074,792 A * | 2/1978 | Zaugg | ....................... | E04G 3/22 182/117 |
| 4,984,654 A * | 1/1991 | Anderson | ................ | E04G 1/152 182/186.7 |
| 5,685,511 A * | 11/1997 | Ghany | ....................... | G09F 7/18 248/201 |
| 5,863,020 A * | 1/1999 | Olson | ................. | A62B 35/0056 248/228.3 |
| 6,371,245 B1 * | 4/2002 | Diana | ................... | A47B 96/024 182/119 |
| 6,983,824 B1 * | 1/2006 | Dandurand | ................ | E04G 1/38 182/150 |
| 7,398,966 B2 * | 7/2008 | Hubbard | ................. | B25B 5/068 269/155 |
| 8,226,074 B1 * | 7/2012 | Hughey | ................... | B25B 5/003 269/155 |
| 8,499,888 B2 * | 8/2013 | Fontaine | .................... | E04G 5/00 182/129 |
| 9,156,138 B1 * | 10/2015 | Prescott | ................... | B25B 5/068 |
| 9,601,036 B2 * | 3/2017 | Barnard, IV | .............. | G09F 7/20 |
| 9,605,775 B2 * | 3/2017 | Marsh | ...................... | F16L 3/237 |
| 2006/0175130 A1 * | 8/2006 | Riley | ......................... | E04G 3/20 182/82 |
| 2006/0272889 A1 * | 12/2006 | Paquette | .................. | A62B 1/04 182/3 |
| 2006/0279033 A1 * | 12/2006 | Watanabe | ............... | B25B 1/103 269/3 |
| 2011/0147122 A1 * | 6/2011 | Canham | .................... | E04G 3/20 182/150 |
| 2011/0271498 A1 * | 11/2011 | Price | ....................... | B25B 5/102 24/457 |
| 2011/0280651 A1 * | 11/2011 | Chiang | .................... | E04G 5/00 403/322.4 |
| 2014/0014797 A1 * | 1/2014 | McSherry | ................. | F16B 2/12 248/231.41 |
| 2014/0251730 A1 * | 9/2014 | Bisset | ................... | E01D 19/106 182/150 |
| 2014/0325825 A1 * | 11/2014 | Hayman | ................ | E04G 5/006 29/525.01 |

* cited by examiner

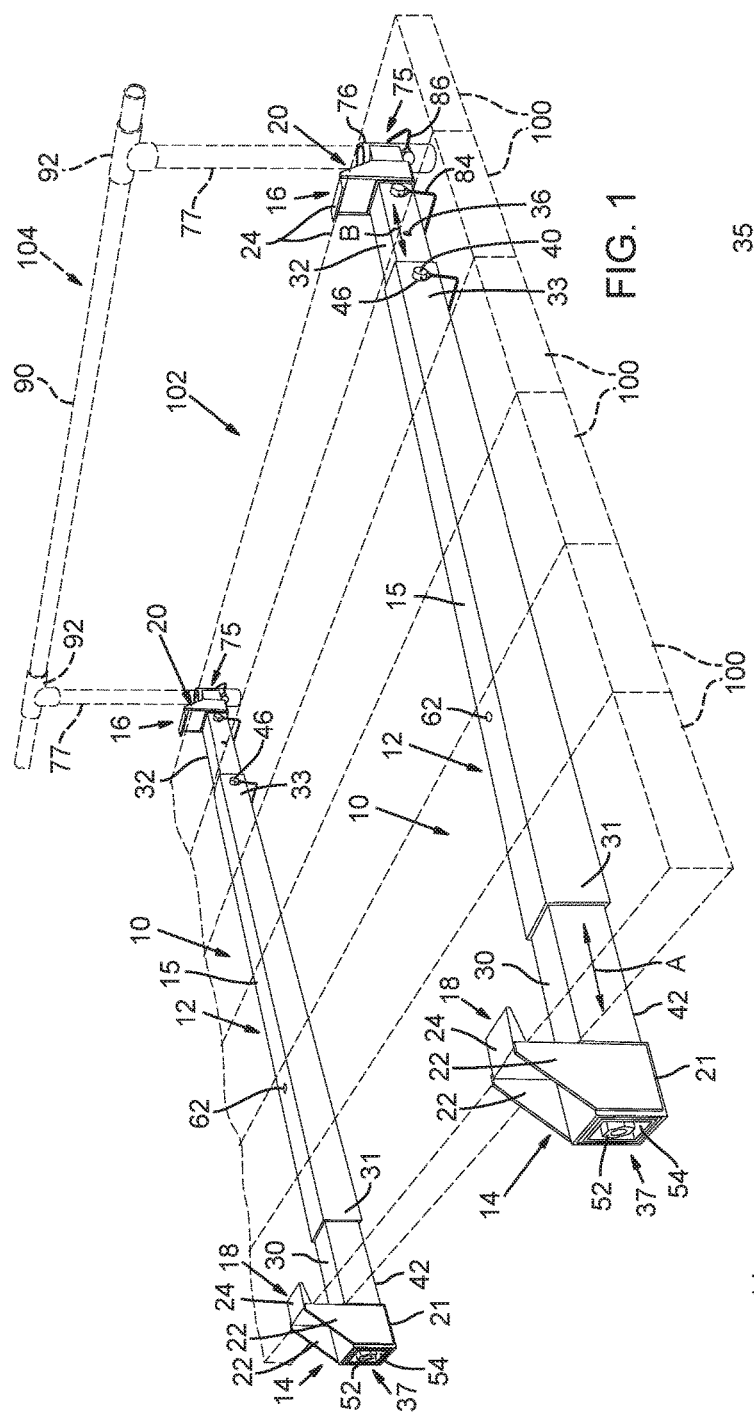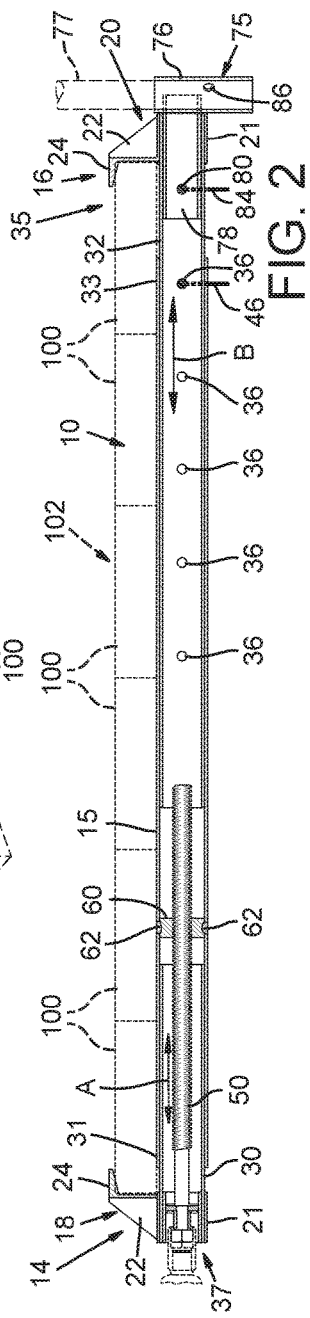

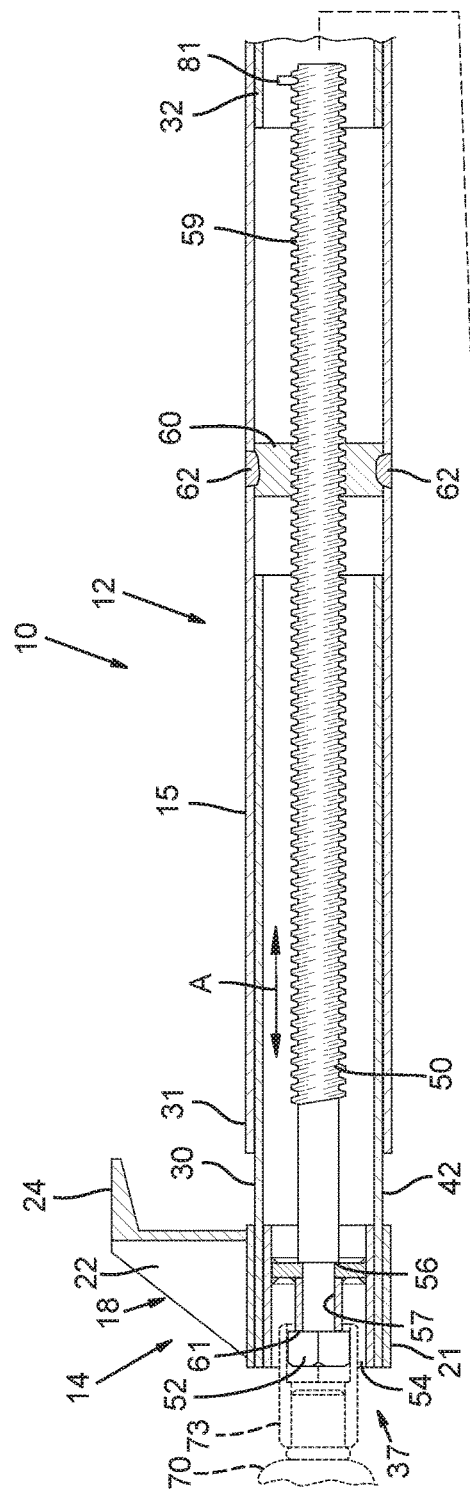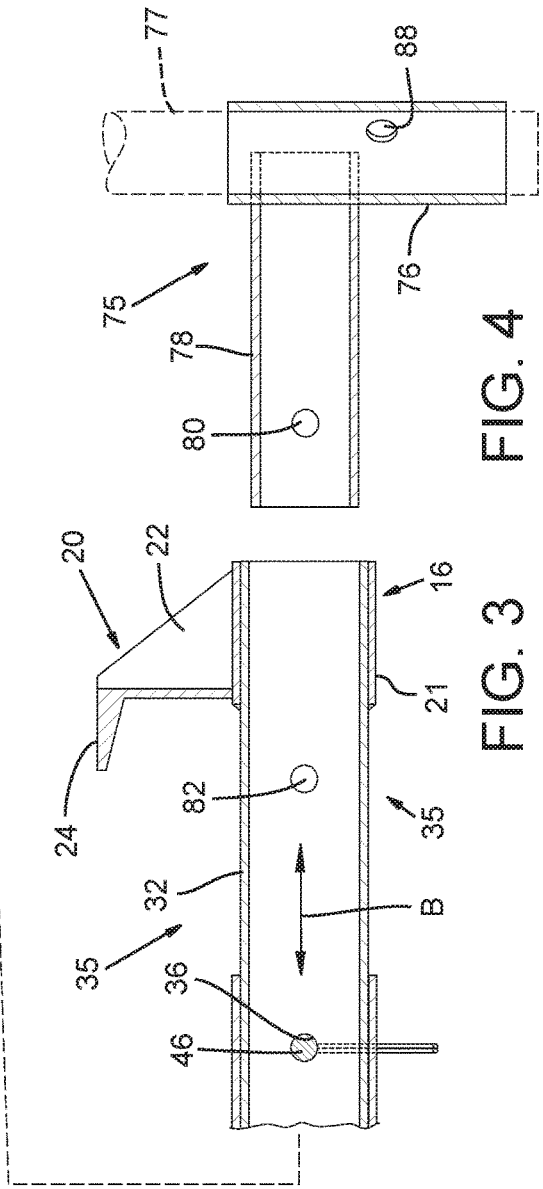

APPARATUS AND METHOD FOR SECURING PLANKS

TECHNICAL FIELD

The present invention relates to safety apparatus for use on scaffolding and the like, and more specifically to a clamp apparatus that secures scaffolding planks to one another to minimize relative movement between the planks and to generally define a safer, stronger and more secure work platform by distributing a point load on a single plank to a uniform load that is supported by all the planks in a single bay.

BACKGROUND

Scaffolds are ubiquitous structures that are employed to support platforms for construction workers during the repair and construction of buildings. The platforms are formed by positioning plural wood planks in side-by-side orientation across horizontal supports that are part of the scaffold framework. There are many types of scaffold frames and the like but a typical framework is fabricated from interconnected lengths of metal tubing. Many different working platforms may be supported by the scaffold structure, at the same or different elevations to provide access to different work sites on a building that is being worked on.

In order to minimize the variability in the structure of scaffolds, and to thus introduce some standardization to the structures, the wood planks that are used in scaffolds are typically standard 2×8 or 2×10 boards. The most typical plank is nominally a 2×10 board that is an engineered LVL (laminated veneer lumber) or solid sawn yellow pine. While different scaffolds use different lengths of planks, the boards are usually either 9, 12 or 16 feet in length. The planks are typically arranges longitudinally in a side-by-side manner on the supporting scaffolding framework headers so that there is a minimum of 6 inches overlap between adjacent planks. The planks are usually not secured together in some manner and in many instances the boards are simply laid side-by-side. As one would guess, this can present a dangerous situation because of the possibility of relative movement between the planks—for instance, gaps opening between planks, or in the case of one board moving when it should be stationary. Despite these known risks, there are no current safety standards that mandate securement of scaffolding planks.

In some instances the side-by-side planks are clamped together. However, prior known scaffold plank clamps apparatus do not fully solve the problems associated with unsecured or inadequately secured planks. One typical practice in the industry is to attach a wooden board across the aligned planks with nails or screws. If the transverse board is attached to the upper surface of the planks, it can cause workers to trip over it. If the board is attached to the lower side of the combined planks there is no tripping risk, but attaching the board to the underside of the planks is not feasible given the difficulty and time required.

There are also examples of mechanical clamps that are designed to stabilize the planks and minimize relative movement. One example is disclosed in U.S. Pat. No. 6,371,245. In that patent, a clamp has a recess into which planks are received with opposed end flanges. An adjustable abutment plate allows the end flanges to be moved toward one another such that the planks are compressed together. The patent describes spikes on the flanges that engage the outer exposed edges of the outermost planks that engage the planks by penetration into the wood. The clamp described in this patent secures the group of clamped planks against relative movement along a horizontal plane.

Despite the known apparatus and methods for clamping scaffold planks, there is a need for a secure, convenient and efficient clamp.

The present invention comprises a clamp that is easily and quickly attached to a scaffold platform that is defined by plural planks laid side-by-side in a scaffold structure. The clamp has upright stops on opposite ends of the clamp that engage the outermost planks in the platform. The clamp is defined by an elongate bar that is longitudinally adjustable, both in a large scale sense and in a smaller scale sense.

The clamp is installed and resides beneath the planks and is therefore not a trip-hazard for workers, and the clamp is readily adjustable to compress the planks to one another to stabilize the platform. The invention creates a stronger and more stable platform by eliminating the vertical deflection of each individual plank as well as any other relative movement. The inventive clamp features adjustable telescopic tubing which allows for the user to adjust the clamp to be utilized on a number of different scaffolding frame widths. The widths that are typical are 3', 3.5', 4' and 5' wide. Finer adjustments to the width of the clamp are made available through a threaded clamping nut that can only be adjusted using a ⅞ socket, which is a size typically carried by a scaffolding worker. This reduces the likelihood of tampering of the apparatus by the lay person.

The invention further comprises guard post support members that may be attached to the clamp and to which a vertical post may be attached. Horizontal rails may be attached to adjacent guard post supports to construct a secure safety rail system.

BRIEF DESCRIPTION OF THE DRAWING

The invention will be better understood and its numerous objects and advantages will be apparent by reference to the following detailed description of the invention when taken in conjunction with the following drawings.

FIG. 1 is an upper perspective view of two scaffold clamps according to the present invention, in which the clamps are installed on and shown attached to plural scaffolding planks laid side-by-side in a scaffold platform. The scaffolding planks and a safety rail system are shown in phantom lines.

FIG. 2 is an elevation and longitudinal cross sectional view of one scaffold clamp shown in FIG. 1.

FIG. 3 is an elevation and cross sectional view of the scaffold clamp shown in FIG. 2, illustrating the components of the clamp in greater detail.

FIG. 4 is an elevation and cross sectional view of the guard post member according to the present invention, shown juxtaposed next to the distal end of the clamp.

DETAILED DESCRIPTION OF ILLUSTRATED EMBODIMENTS

Figure 5:
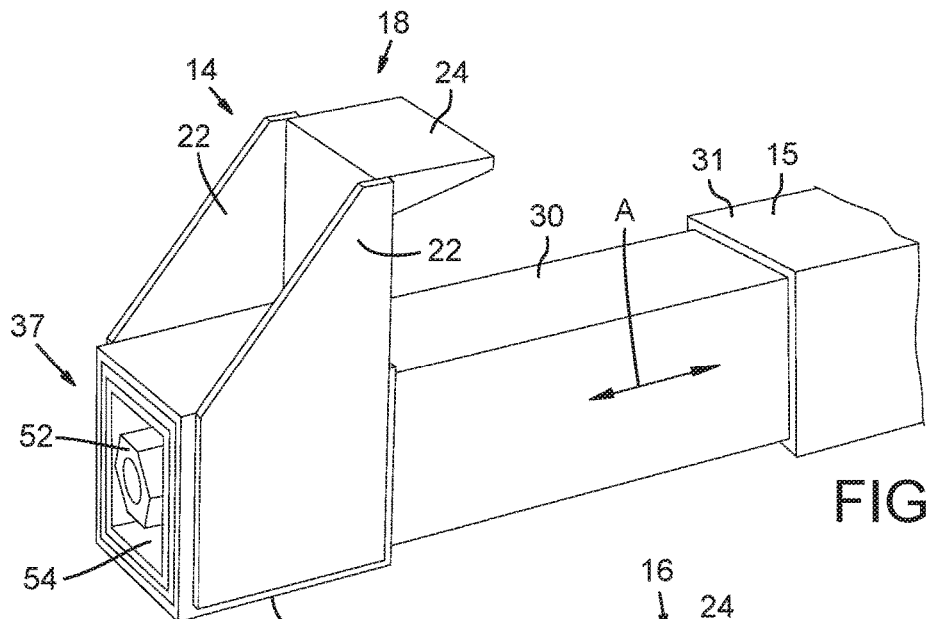
FIG. 5 is a close up perspective view of the proximate end of the clamp shown in FIG. 1.

The invention will now be described in detail with reference to the drawings. It will be understood that relative directional terms are used at times to describe components of the invention and relative positions of the parts. As a naming convention, the plane of a scaffolding platform such as that shown in FIG. 1 is considered, for this specification, to be a generally horizontal surface. Other relative directional terms correspond to this convention: "upper" refers to the direction above and away from the scaffolding platform; "lower" is generally in the opposite, downward direction, "inward" is the direction from the exterior of a structure toward the interior, "vertical" is the direction normal to a horizontal ground plane, and so on.

Turning now to the drawings, a first embodiment of a scaffold plank clamp 10 according to the present invention is illustrated. In the illustration of FIG. 1, two scaffold planks 10 are shown installed with a plurality of scaffold planks 100; the combined planks 100 define a scaffold platform 102.

The scaffold clamp 10 is defined an elongate member referred to generally with reference number 12 and having a first end 14, sometimes referred to the proximate or adjustment end 14, and an opposite end 16 that is referred to as the distal end. Elongate main member 12 defines a longitudinal axis and is adapted to have an adjustable longitudinal length between the proximate and distal ends. This is accomplished with a first tube 30 that is, as detailed below, longitudinally and reciprocally received in the interior of the first or proximate end 31 of a main tube 15. The ability to longitudinally adjust the length of clamp 10 is further facilitated with a second tube 32 that is longitudinally and reciprocally received in the interior of the second, or distal end 33 of main tube 15. As detailed below, both of the first and second tubes 30 and 32 may be fixed relative to the main tube 15 when the first and second tubes are in a desired position.

An upright stop, referred to herein as a plank stop 18 is secured to and extends from the distal end 14 of first tube 30, and an identical upright stop (also referred to as a "plank stop") 20 is secured to and extends from the distal end 16 of second tube 32. Each of the upright stops 18 and 20 is identical and comprises a pair upwardly projecting arms 22 that are secured to the outer sides of the first and second tubes 30, 32, and an inwardly extending tab 24. The upwardly projecting arms define a planar stop plate 23. It will be clear from the drawings that the purpose of the upright stops 18 and 20 is to define hooks between which is defined a plank receiving area and in which the hooks capture the outermost scaffolding planks 100 in a platform 102 with the edges of the planks captured under the inwardly projecting tabs 24 and against stop plate 23, as shown in FIGS. 1 and 2, when clamp 10 is used to clamp plural planks together in a stable platform 102. The opposed plank stops 18 and 20 thus define a plank-receiving area between the stops where the planks rest on the main tube 15 and the first and second tubes 30 and 32. Importantly, since the inwardly extending tabs 24 capture planks 100 in the plank-capturing area beneath the tabs 24, but do not physically penetrate the planks, the hooks defined by stops 18 and 20 cause no physical damage to the planks. The plank stops 18 and 20 may be fabricates in the form of a sleeve that fits over and is secured to the ends of the tube 30, 32 onto which the stops are attached. For example, in the drawings the stops 18 and 20 include a bottom plate 21 that interconnects the lower edges of the upwardly projecting arms 22 to define a rectangular sleeve. The stops may be attached to the tubes by welding or other appropriate fastening techniques.

As noted, elongate main member 12 defines an adjustable-length member that as noted previously includes a first tube 30 that is received in the interior of a first end of main tube 15 and second tube 32 that is received in the interior of a second end of the main tube 15. Both of the tube and second tubes 30 and 32 are longitudinally movable within the interior of main tube 15 so that the overall length of member 12 may be adjusted to thereby adjust the separation between upright stops 18 and 20. The elongate member 12 is preferably rectangular in cross section as shown, and more preferably square as shown in the drawings. This prevents relative rotation of the first and second tubes 30 and 32 relative to the main tube 15.

As noted, first tube 30 is longitudinally movable within the interior of main tube 15—that is, the first tube is telescopically slidable within the interior of the main tube to allow for adjustable in the length of clamp 10. Clamp 10 includes separate structures for variable and selective adjustment of the length between upright stops 18 and 20, and which allow for compression of plural scaffold planks 100 between the upright stops 18 and 20, with the outer edges of the outermost of the plural planks captured under the inwardly extending stops 22 and 24. The first adjustment mechanism 35 is at the distal end 16 of elongate member 12 and is defined by plural spaced apart through bores 36 formed in second tube 32 and a through bore 40 formed in the mating and opposed side walls of main tube 15, as best shown in the cross sectional illustrations of FIGS. 2 and 3. The plural bores 36 are spaced along the length of second tube 32 where the tube is received within the interior of main tube 15. As the second tube 32 is moved longitudinally into, and out of, main tube 15, one and then another of the plural bores 36 in the second tube 32 align with the bore 40 in the main tube 15. When the position of second tube 32 relative to main tube 15 is as desired and a bore 36 aligns with bore 40, a pin 46 (such as, for example, a locking clevis pin or a hood-type pin) may be inserted into the aligned bores 36, 40 to thereby fix the position of second tube 32 relative to main tube 15. This adjustment method fixes the length between upright stops 18 and 20 according to the spacing between the plural bores 36 and therefore the first adjustment mechanism 35 may aptly be referred to as a "gross" length adjustment mechanism.

With reference to the cross sectional drawings of FIGS. 2 and 3, the amount of compression that may be applied to the plural planks 100 is adjustable with the hole-and-pin, or gross adjustment mechanism 35 just described, only insofar as the alignment of bores 36 and 40 and the spacing between adjacent bores 36 allows.

Clamp apparatus 10 further includes a fine adjustment mechanism 37 that provides for active and significant compression of plural planks 100 between upright stops 18 and 20. With returning reference to FIGS. 2 and 3, the fine adjustment mechanism 37 is at the proximate end 14 of elongate member 12 and is defined by a threaded rod 50 that extends through the interior first tube 30 and which has its head end 52 defined by an end that may be manipulated by a user (preferably in the form of a hex bolt head), and which is accessible through the open end 54 of tube 30. The rod 50 extends through a central opening 57 formed in a plate 56 that is fixed in the interior of first tube 30 adjacent open end 54. Plate 56 has a collar 61 that defines the central opening 57 and the head end 52 of rod 50 abuts and bears against the collar 61 around the opening 57. The rod 50 is axially rotatable. The opposite, interior-most end 59 of threaded rod 50 is threaded through a female threaded block 60 that is fixed to the interior of main tube 15—the threaded block 60 may be fixed within main tube 15 in any appropriate manner such as by welding the block in place, as shown with plug welds 62, or fixing it with appropriate fasteners. It will be appreciated that as threaded rod 50 is axially rotated, the first tube 30 telescopes relative to main tube 15 in the direction according to the direction of rotation of the rod. Thus, as rod 50 is rotated in the clockwise direction (with reference to FIG. 1), first tube 30 is moved inwardly into main tube 15 to thereby effectively shorten the distance between upright stops 18 and 20. Rotation of the rod 50 in the opposite direction—that is, unscrewing the rod—causes first tube 30 to move outwardly relative to main tube 15 and thus increases the distance between the stops 18 and 20. It will be further appreciated that this fine adjustment mechanism 37 allows for significant compression force to be applied to plural planks 100 captured between opposite upright stops 18 and 20 as shown in FIG. 1. Typically, a ratchet wrench 70 as shown in FIG. 3 is fitted with a socket 73 that is sized to fit onto head end 52 of rod 50 and is used to manipulate and adjust the fine adjustment mechanism 37, and can apply substantial compressive force to the planks 100 that define platform 102. A thread-stop 81 may optionally be used on the distal end of the rod 50 to prevent the rod from being completely removed from threaded block 60. Thread-stop 81 may be, for example, a pin 81 that prevents unscrewing of the rod from the block, or compromised threads and the like. Thread stop 81 is optional since if it is omitted the user may back the threaded rod out completely for cleaning and the like.

Because threaded rod 50 is received in first tube 30 and is accessible and visible only through open outer end 54 thereof, the rod 50 is in significant manner concealed such that it is not readily seen by passers-by. As such, use of the fine adjustment mechanism 37 by someone not familiar with its proper use is unlikely. Moreover, because the fine adjustment mechanism 37 requires use of a ratchet wrench and a properly sized socket, preferably ⅞$^{th}$ inch, it is unlikely that a random person who might access the scaffold without authorization would try to adjust or vandalize the mechanism. On the other hand, the socket is of a size commonly employed and carried by scaffolding professionals while plying their craft, so adjustment by authorized personnel is routine.

Scaffold plank clamp 10 is designed for the scaffolding industry to provide high strength clamping force, and deflection reducing rigidity on wood or laminated wood planks 100 when they are arranged in typical side by side manner on top of a scaffold support structure to define a scaffold platform 102, as shown in the figures. The clamp 10 is configured to exert significant compressive force to the outside edges of the combined planks, forcing them together while upright projecting stops 18 and 20 prevent the clamp 10 from being dislocated. As a result, the body of the clamp, that is, elongate member 12, acts as a "strong back" or perpendicular spine to the whole arrangement the platform 102 defined by the plural planks 100 thereby causing them to move uniformly and eliminating individual deflection. With the clamp 10 secured to a group of planks 100, vertical deflection of any of the individual planks is eliminated. The increased platform 102 strength afforded by clamp 10 thus increases the load capacity of the entire arrangement. This uniform movement of the plural planks 100 caused by the presence of one or more clamps 10 increases safety by providing a more sure footing for any potential user of the deck created by the plank and allows for the placement of tools, equipment or goods on the plank without creating irregularities in the walking surface. Another benefit of the clamp 10 according to the present invention is that it greatly reduces the likelihood that any one or all of the planks could be moved or dislocated accidentally either by inadvertent contact by personnel or by various acts of nature such as high speed winds. And because apparatus 10 is positioned below the deck defined by the plural planks 100, there is no risk that workers will trip on the device.

As described above, the clamp 10 has two adjustments mechanisms of different type and form. The first, referred to as the "gross adjustment mechanism 35," is created by the second tube 32 which can be telescoped within the main tube 15 at the distal end 33 of the main tube and secured using a pin 46 extending through a selected on of plural bores 40 in the main tube that has aligned with any one of plural bores 36 in second tube 32. The second adjustment mechanism, referred to herein as the "fine adjustment mechanism 35," is at the proximate end 12 of apparatus 10 and is defined by a threaded rod and a mating female threaded insert fixed in the interior of the main tube 15. This mechanism allows for finer adjustment and high clamping force to be achieved with plural planks 100 captured between upright stops 18 and 20.

The furthest extent (i.e., distance) between upright stops 18 and 20, and the shortest collapsible state of the clamp 10 between the upright stops is preferably suited to the two most commonly used widths of scaffolding plank arrangements currently in standard practice by scaffolding professionals today.

Figure 6:
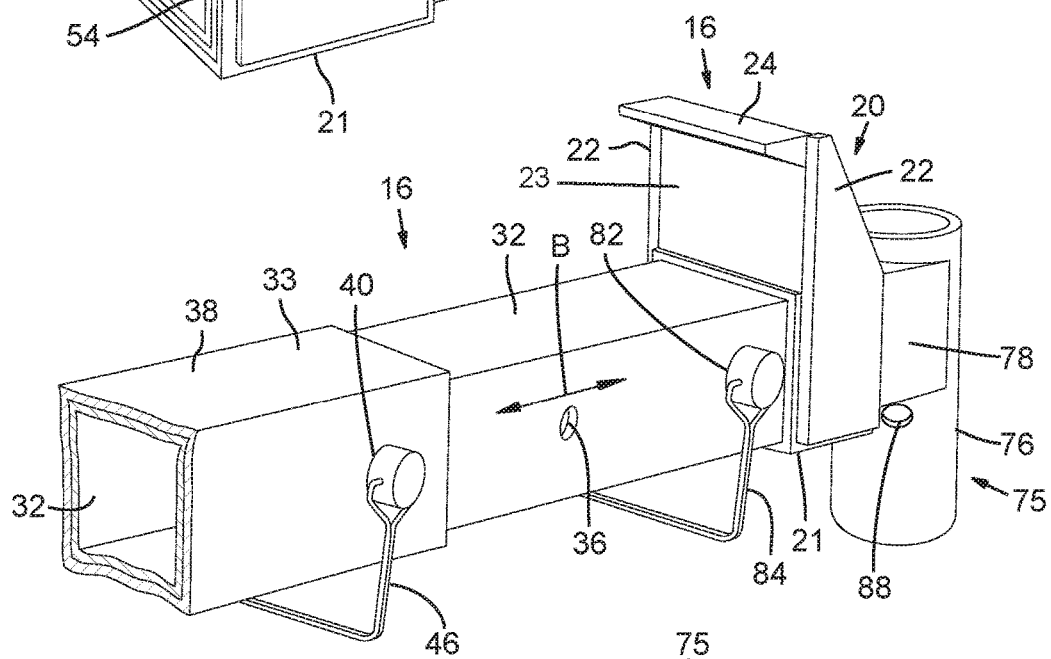
FIG. 6 is a close up perspective view of the distal end of the clamp shown in FIG. 1.
Figure 7:
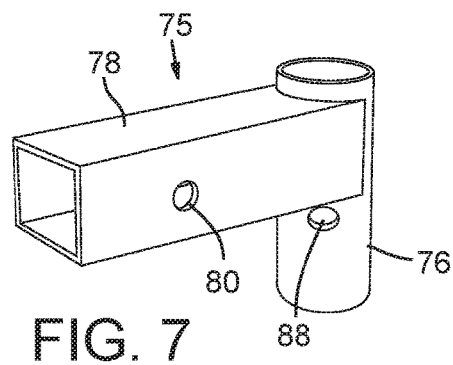
FIG. 7 is a close up perspective view of the guard post member according to the present invention.

The scaffolding clamp 10 according to the present invention further comprises a guard post adaptor that is identified in the drawings with reference number 75. Guard post adaptor 75 is defined by a vertically oriented tube 76 that is adapted to receive a post 77 that is part of a safety rail system 104 (FIG. 1). A transverse tube 78 is attached at right angles to the vertically oriented tube 76 and the transverse tube is of a size and shape that the transverse tube may be inserted into the open distal end 16 of second tube 32 as shown in, for example, FIGS. 2 and 6. A through bore 80 is formed in transverse tube 78 and a through bore 82 is formed in second tube 32. When transverse tube 78 is inserted into second tube 32, bore 80 aligns with bore 82 and a pin 84 (again, such as a locking clevis pin) is inserted through the aligned bores to secure guard post adaptor 75 to the elongate member 12. An appropriately sized and shaped post 77 is inserted into vertically oriented tube 76 and is secured in the desired position with a pin 86 that extends through a through bore 88 in the tube 76 and a through bore (not shown) in post 77. Post 77 may include plural spaced apart bores to allow for adjustment of the height of the post.

A guard post adaptor 75 is secured in the manner described above to adjacent clamp apparatus 10 as shown in FIG. 1 and a post 77 is attached to each of the guard post apparatuses. A rail 90 is then attached horizontally between to the two posts 77 with appropriate attachments such as the brackets 92 shown in FIG. 1.

The method of installing clamp apparatus 10 on a group of planks 100 will now be described. With the desired number of planks laid side by side the fine adjustment mechanism 37 is manipulated to move plank stop 18 to its outermost position—that is, by rotating rod 50 with ratchet 70 in the counterclockwise direction to move plank stop 18 outwardly. In the figures the arrows A illustrate the reciprocal movement of first tube 30 and its attached plank stop 18. When the rod 50 is rotated to move plank stop to its outermost position, the plank stop moves to the left in the figures. Next, the gross adjustment mechanism 35 is adjusted so that the overall length of elongate tube 12 between plank stops 18 and 20 is close to, but slightly greater than the overall width of the platform 102 defined by the planks 100. The manner of adjusting the gross adjustment mechanism 35 is detailed above but requires removal of pin 84, then sliding tube 32 and its attached plank stop 20 either into or out of tube 15 (arrows B in the drawings) until a bore 36 aligns with bore 40 when the desired length is achieved. The pin 84 is reinserted to fix the position of the gross adjustment mechanism 35.

The clamp mechanism 10 is then positioned below the platform and the plank stop 20 is attached to the outermost plank 100 with the plank received in the hook defined under tab 24. With the clamp mechanism 10 held against the lower side of the platform and the plank stop 18 positioned adjacent to the nearest plank 100, the fine adjustment mechanism 37 is operated by rotating rod 50 with a ratchet 70 (turning the rod in the clockwise direction). This moves plank stop 18 inwardly and as the stop approaches the plank, the edge of the plank is captured in the hook defined under tab 24, against stop plate 23. The fine adjustment mechanism 37 is used to apply pressure to the outermost plank 100 that is captured by plank stop 18 and to thereby compress together all of the planks 100 in the platform 102.

A second clamp mechanism may then be installed on the same platform 102 and the two clamp mechanisms are tightened using fine adjustment mechanism 37 to secure the planks in the platform.

If used in a particular installation, the guard post apparatus is then installed as described above.

With returning reference to FIG. 1, the clamp apparatus 10 may be oriented in different positions relative to a building that the scaffold is being used with. For instance, the scaffold platform 102 may be oriented next to a building such that the building is next to the proximate ends 14 of the clamps 10—typically there is ample space between the building and the distal ends 14 for a worker to access the fine adjustment mechanisms 37 with a socket wrench 70 to clamp the planks 100. When in this position, the safety railing 104 is at the "outside" of the platform 102. Alternately, and depending on the requirements of the particular installation, the clamps 10 may be oriented such that the proximate ends 14 are oriented away from the building.

Those of skill in the art will appreciate that the invention may be modified in inconsequential and equivalent manners without departing from the scope of the invention. For example, it is possible to have the second plank stop 16 fixed on the main tube 15 so that the only adjustment of the distance between the first and second plank stops along the longitudinal is provided by the second adjustment mechanism 37. To identify yet another equivalent modification, the first and second tubes may be of a greater diameter than the main tube and thus the relative positions of the main tube and first and second tubes would be reversed relative to the positions shown in the drawings.

It will further be appreciated that while the clamp 10 has been illustrated and described in respect of its use as a scaffolding plank clamp, those in the general construction and other trades are likely to find numerous other uses for the clamp, for instance, for clamping glued boards or steel for welding.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A combination of a clamp and plural scaffolding planks, the combination comprising:

said plural scaffolding planks, each scaffolding plank in the plurality of scaffolding planks having opposed side edges;

said clamp comprising,
an elongate main tube having opposed first and second ends and defining a longitudinal axis;
a first tube reciprocally slidable relative to the main tube at the first end thereof and along the longitudinal axis, the first tube having a first stop;
a second tube reciprocally slidable relative to the main tube at the second end thereof, the second tube having a second stop, the first stop on the first tube and the second stop on the second tube spaced apart from one another by a distance that defines a plank-receiving area therebetween for receiving the plural scaffolding planks in a side-by-side orientation in which the planks are parallel to one another and in which side edges of adjacent planks about one another to form a planar scaffolding platform;
wherein the first stop is movable along the longitudinal axis to selectively increase or decrease the distance between the first and second stops; and a guard post adaptor connected to the second tube and reciprocally slidable therewith, the guard post adaptor having a safety rail tube oriented perpendicularly to the planar scaffolding platform; and
a safety rail post attached to the safety rail tube such that the safety rail post is oriented perpendicularly to the planar scaffolding platform and wherein a position of the safety rail post relative to the guard post adaptor may be adjusted.

2. The combination according to claim 1 further comprising a threaded rod in the first tube and extending at least partially into the main tube, the threaded rod having a distal end threaded through an opening in a block fixed in the main tube and having a proximate end defined by a hex head.

3. The combination according to claim 2 wherein the first tube has an open proximate end and including a member fixed in the first tube adjacent to the open proximate end, and wherein the hex head bears against the member.

4. The combination according to claim 3 wherein the member is defined by a plate having an opening therein and a collar with an opening aligned with the opening in the plate, and wherein the hex head bears against the collar.

5. The combination according to claim 4 wherein the hex head is received in the first tube such that the hex head is positioned within the first tube and does not extend past the open proximate end.

6. The combination according to claim 4 in which when said threaded rod is rotated a first direction the first stop on the first tube moves a first direction relative to the main tube and when the threaded rod is rotated in a second direction the first stop on the first tube moves in a second direction relative to the main tube.

7. The combination according to claim 1 in which the second tube is selectively positionable to a desired position relative to the main tube and fixed at the desired position.

8. The combination according to claim 7 in which the main tube defines plural through holes and the second tube defines at least one through hole, and wherein the at least one through hole in the second tube aligns with a selected one of the plural through holes in the main tube.

9. The combination according to claim 8 including a pin inserted through the aligned holes in the main and second tubes.

10. The clamp according to claim 1 wherein the position of the safety rail post relative to the safety rail tube may be fixed at a selected height with a pin extending through a bore in the safety rail tube.

11. A combination of a clamp and plural planks in a platform in which the plural planks are secured in a planar arrangement, the combination, comprising:
   said clamp comprising,
      an elongate main tube having open opposed first and second ends;
      a first tube received in the open first end of the main tube and reciprocally slidable and selectively positionable therein, the first tube having a first stop;
      a second tube received in the open second end of the main tube and reciprocally slidable and selectively positionable therein, the second tube having a second stop and wherein a platform receiving area is defined between the first and second stops;
   said plural planks arranged in a side-by-side and parallel orientation in the platform receiving area, wherein each plank in the plurality of planks has opposed side edges and wherein the side edges of adjacent planks in the plurality about one another to thereby define said platform which is planar;
   a safety rail tube attached to the second tube so that the safety rail tube is reciprocally slidable with the second tube, wherein the safety rail tube is oriented perpendicularly relative to the planar platform; and
   a safety rail post attached to the safety rail tube such that the position of the safety rail post relative to the safety rail tube may be adjusted between at least first and second positions.

12. The combination according to claim 11 in which the first and second stops are each defined by a planar stop plate and an inwardly projecting tab.

13. The combination according to claim 12 wherein the first stop bears against a first of outermost planks in the platform and the second stop bears against another of the outermost planks in the platform.

14. The combination according to claim 13 in which the first stop is compressed against the first outermost plank and the second stop bears against the other of the outermost planks to thereby compress together all of the planks in the platform.

15. The combination according to claim 14 wherein the inwardly projecting tab on the first stop does not penetrate the first outermost plank and the inwardly projecting tab on the second stop does not penetrate the other of the outermost planks.

16. A clamp for securing planks in a horizontal platform, comprising:
   an elongate main tube having open opposed first and second ends and defining a longitudinal axis;
   a first stop;
   a second stop separated by a first distance from the first stop;
   at least the second stop movable along the longitudinal axis to change the first distance from the first stop to the second stop;
   a second tube attached to the second stop and movable therewith, the second tube oriented vertically relative to the horizontal platform; and
   a post adjustably connected to the second tube such that the post is oriented vertically and perpendicular to the platform and such that the position of the post relative to the second tube may be changed.

17. The clamp according to claim 16 in which both of the first and the second stops are independently and reciprocally movable along the longitudinal axis.

* * * * *